United States Patent [19]

Nakamura

[11] Patent Number: 5,581,950
[45] Date of Patent: Dec. 10, 1996

[54] WEATHER STRIP

[75] Inventor: Toshiaki Nakamura, Hiroshima, Japan

[73] Assignee: Nishikawa Rubber Co., Ltd., Hiroshima, Japan

[21] Appl. No.: 563,313

[22] Filed: Nov. 28, 1995

[30] Foreign Application Priority Data

Nov. 30, 1994 [JP] Japan .................................. 6-323662

[51] Int. Cl.⁶ .................................................. E06B 7/16
[52] U.S. Cl. ........................................ 49/475.1; 49/498.1
[58] Field of Search ............................. 49/498.1, 479.1, 49/475.1

[56] References Cited

U.S. PATENT DOCUMENTS 5,127,193 7/1992 Okada et al. .................. 49/498.1 X

*Primary Examiner*—Philip C. Kannan
*Attorney, Agent, or Firm*—Flynn, Thiel, Boutell & Tanis, P.C.

[57] ABSTRACT

A hollow weather strip which is excellent in an external appearance is provided. The weather strip comprises an extrusion portion having a given width, a mold portion connected to an end side of said extrusion portion. The mold portion has a slot at a back surface thereof and has a width which is larger than the width of the extrusion portion by a width of the slit. The extrusion portion has a substantially V-shape spread slit provided on an end back surface thereof, and the slit is continuous from the slot and is consecutively reduced in a width as said V-shaped spread slit recedes from a position where the extrusion portion and the mold portion are connected to each other.

1 Claim, 4 Drawing Sheets

WEATHER STRIP

BACKGROUND OF THE INVENTION

1. Field of the Invention

The present invention relates to a hollow weather strip having a slit and a slot at a back surface thereof, particularly to an improvement of a connecting portion between an extrusion portion and a mold portion.

2. Prior Art

First, second and third prior art weather strips are illustrated in FIGS. 1 through 3. Employed in the same figures, a symbol denoted at, i.e. a reverse isosceles triangle which is partitioned by a center line extending from a vertical angle thereof wherein one half is white and the other is painted over with black. The portion painted over with black represents a mold portion and a portion which is not painted over with black represents an extrusion portion. As a structure of a connecting portion between the extrusion portion and the mold portion of a hollow weather strip having a slit and a slot respectively at a back surface thereof, there has been generally employed a structure as illustrated in FIG. 1 in which a mold portion 20 has a slot 21 width of which ranges from 2 to 4 mm at a back surface thereof in a longitudinal direction thereof, and an extrusion portion 10 has a slit 11 at an end back surface thereof. A width of the slit 11 is smaller than that of the slot 21.

However, the first prior art weather strip has a problem in that since the extrusion portion 10 and the mold portion 20 have the same width Y at back surfaces thereof, the width of the mold portion 20 is smaller than the width Y when the slit 11 and the slot 21 are closed by adhesive respectively for holding the shape of the weather strip, which mars an external appearance of the weather strip. To improve this problem, the width of the back surface of the mold portion 20 is larger than the width Y of the extrusion portion 10 by a width Z of the slot 21 shown in FIGS. 2 and 3, which permits however the widths of the mold portion 20 and the extrusion portion 10 at the connecting position thereof to remain the width Y of the extrusion portion 10, which causes a problem in that the widths of the slit 11 and the slot 21, after the slit 11 and the slot 21 are closed by adhesive respectively, are not uniform. As a result, it is inevitable that an external appearance of the weather strip is marred. The slot 21 is provided to serve a hole to eject a core of a mold in a molding process of a mold portion to hollow the mold portion.

However, the prior art weather strip has such a problem in that when the slit 11 and the slot 21 are closed by adhesive respectively for holding the shape of the weather strip, widths of the slit 11 and the slot 21 are not uniform after they are closed by adhesive respectively which mars an external appearance thereof.

SUMMARY OF THE INVENTION

It is an object of the present invention to provide a weather strip which solved the problem of the prior art weather strip and which comprises an extrusion portion having a given width, a mold portion connected to an end side of said extrusion portion. The mold portion has a slot at a back surface thereof and has a width which is larger than the width Y of the extrusion portion by a width of the slot. The extrusion portion has a substantially V-shape spread slit provided on a back end surface thereof, and the slit is continuous from the slot of the mold portion and is consecutively reduced in a width as said slit recedes from a position where the extrusion portion and the mold portion are connected to each other.

When the slit and the slot are closed by adhesive respectively, the width of the extrusion portion and the mold portion are made uniform, which remarkably improves an external appearance of the weather strip compared with the prior art weather strip.

PREFERRED EMBODIMENT OF THE INVENTION

First Embodiment (FIGS. 4 through 6):

A weather strip according to a first embodiment of the invention will be described now with reference to FIGS. 4 through 6.

Figure 1:
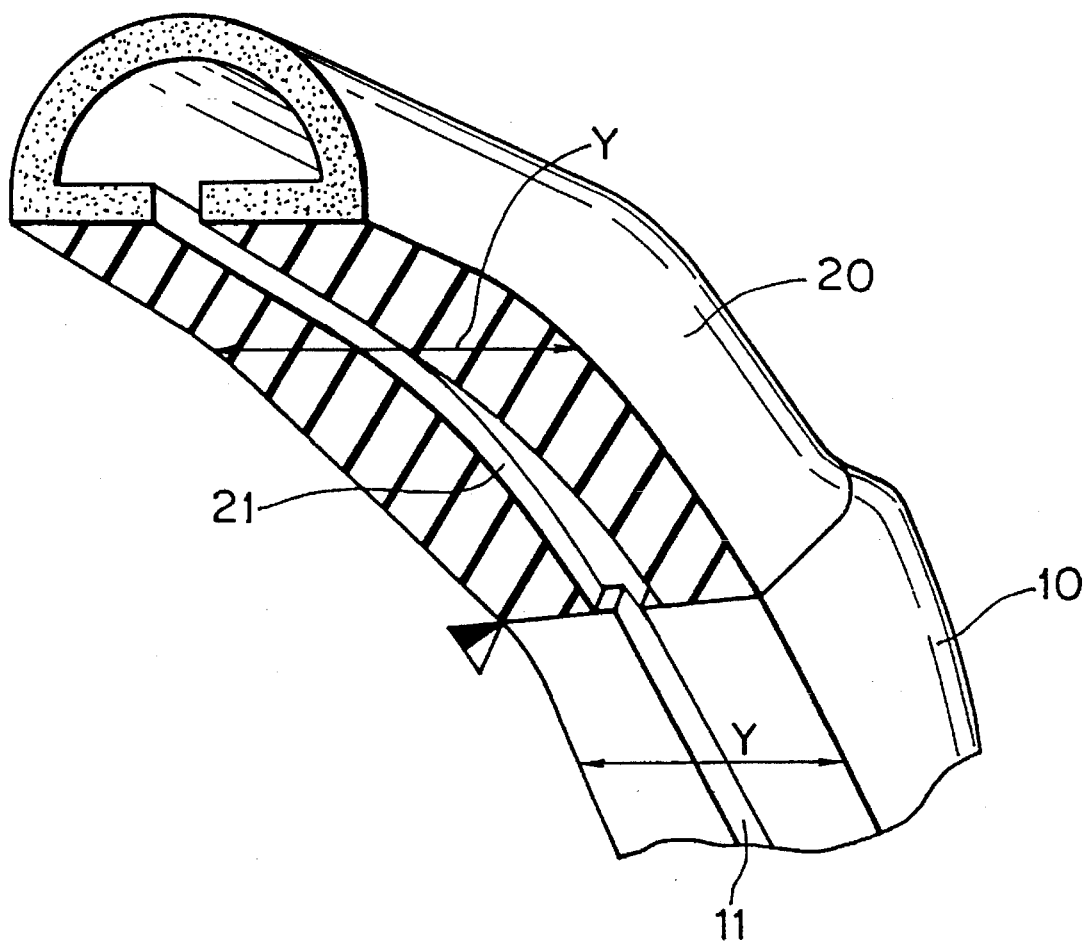
FIG. 1 is a perspective view of a first prior art weather strip.
Figure 2:
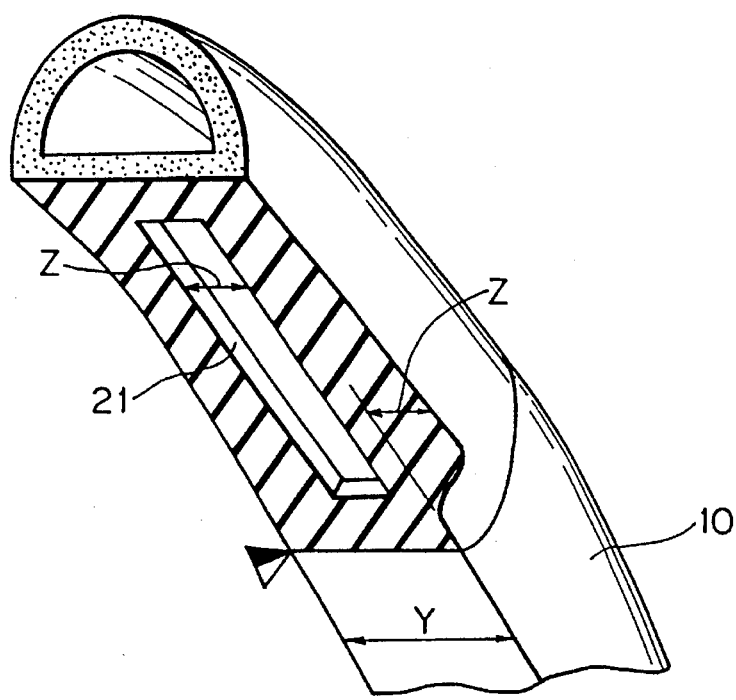
FIG. 2 is a perspective view of a second prior art weather strip.
Figure 3:
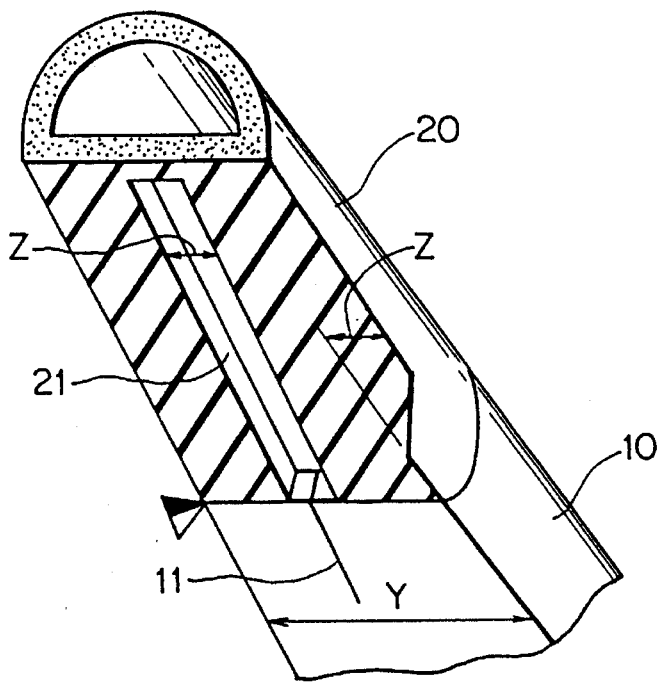
FIG. 3 is a perspective view of a third prior art weather strip.
Figure 4:
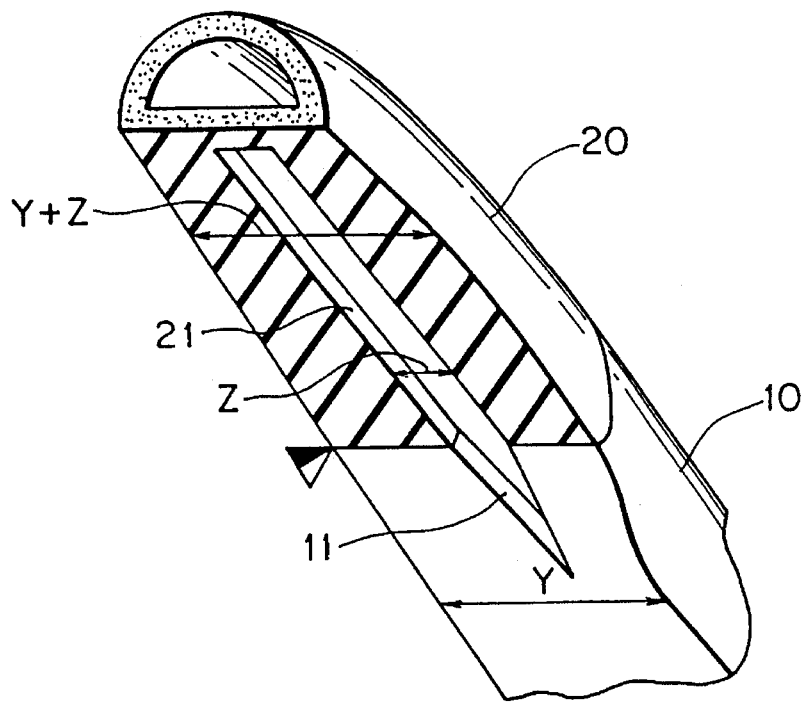
FIG. 4 is a perspective view of a weather strip according to a first embodiment of the invention.
Figure 5:
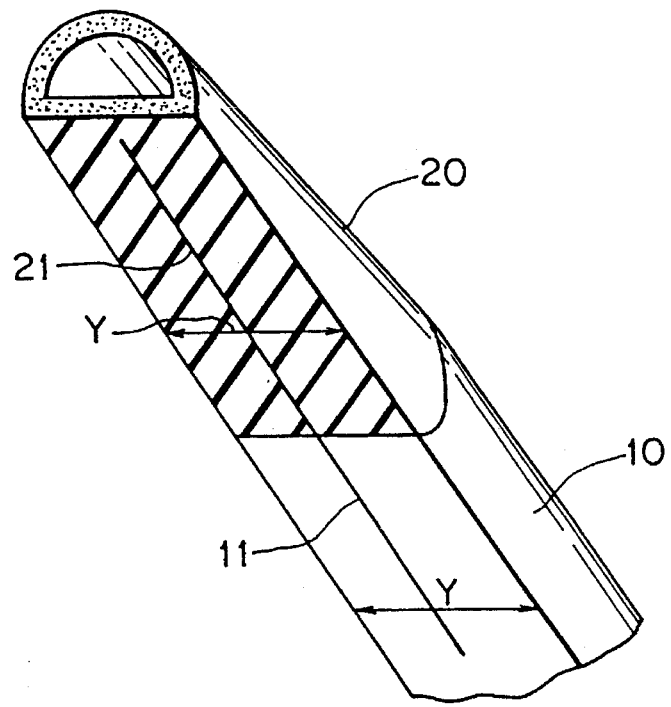
FIG. 5 is a perspective view showing a state where slit and slot of the weather strip of FIG. 4 are closed respectively.
Figure 6:
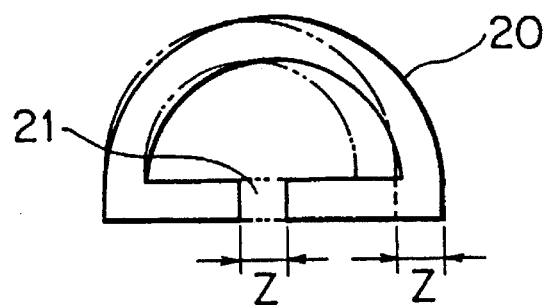
FIG. 6 is a sectional view of the weather strip of FIG. 4.

In FIGS. 4 through 6, denoted at 10 is a hollow extrusion portion, 20 is a hollow mold portion connected at an end side of the extrusion portion 10. The mold portion 20 has a slot 21 at a back surface thereof, and the slot 21 has a width ranging from 2 through 4 mm in the longitudinal direction thereof. A width of the mold portion 20 is larger than a width Y of the extrusion portion 10 by a width Z of the slot 21 so that it becomes equal to the width Y of the extrusion portion 10 when the slot 21 and a slit 11 are closed by adhesive respectively. The slit 11 is provided on an end back surface of the extrusion portion 10 and is continuous from the slot 21, namely, the slit 11 extends from the slot 21 along the extended line of the slit 21. The slit 11 has the same width as the slot 21 at a position where the extrusion portion 10 and the mold portion 20 are connected to each other but the width of the slit 11 is reduced as the slit 11 recedes from the position where the extrusion portion 10 and the mold portion 20 are connected to each other. A width of the extrusion portion 10 at an end portion is gradually changed by the width of the slit 11 and it is larger than the width Y at the remaining portion of the extrusion portion 10. The slit 11 is provided by cutting the extrusion portion 10 by a cutter, scissors, etc. and it can be apparently spread in a width direction to form a V shape.

Figure 7:
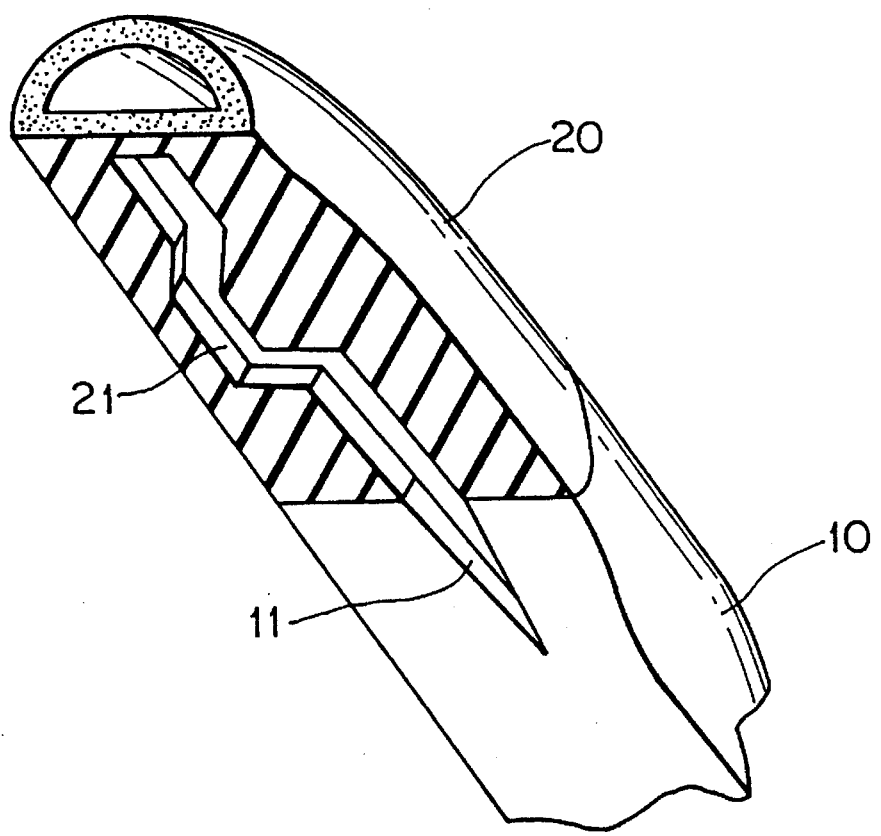
FIG. 7 is a perspective view of a weather strip according to a second embodiment of the invention.

Second Embodiment (FIG. 7):

A weather strip according to a second embodiment shown in FIG. 7 has a zigzag slot 21, namely, the slot 21 is opened in a zigzag shape.

Although FIGS. 4 through 7 show a combination of the hollow extrusion portion and the hollow mold portion in shapes, the present invention is not limited to such shapes, and can similarly be applied to a combination of a hollow extrusion portion, a hollow mold portion and a hollow extrusion portion. In manufacturing the weather strip according to the present invention, the mold portion can be integrally manufacture with the extrusion portion by providing the slit on the end back surface of the hollow extrusion portion by cutting the same surface, and inserting the end of the hollow extrusion portion into a core for forming a hollow portion in the mold portion, machining the extrusion portion by permitting the slit to be spread, namely, to spread the slit in a substantially V shape.

Since the present invention is structured as mentioned above, the widths of the extrusion portion and the mold portion are uniform, which remarkably improves the outward appearance of the weather strip.

What is claimed is:

1. A weather strip comprising an extrusion portion having a given width, a mold portion connected to an end side of said extrusion portion, said mold portion having a slot at a back surface thereof, said mold portion having a width which is larger than said width of said extrusion portion by a width of said slot, said extrusion portion having a substantially V-shaped spread slit provided on an end back surface thereof, said slit being continuous from said slot and being consecutively reduced in a width as said V-shaped spread slit recedes from a position where said extrusion portion and said mold portion are connected to each other.

* * * * *